April 28, 1964 R. C. RANEY 3,130,982
COUPLING DEVICE FOR VEHICLES
Filed Jan. 4, 1962 2 Sheets-Sheet 1
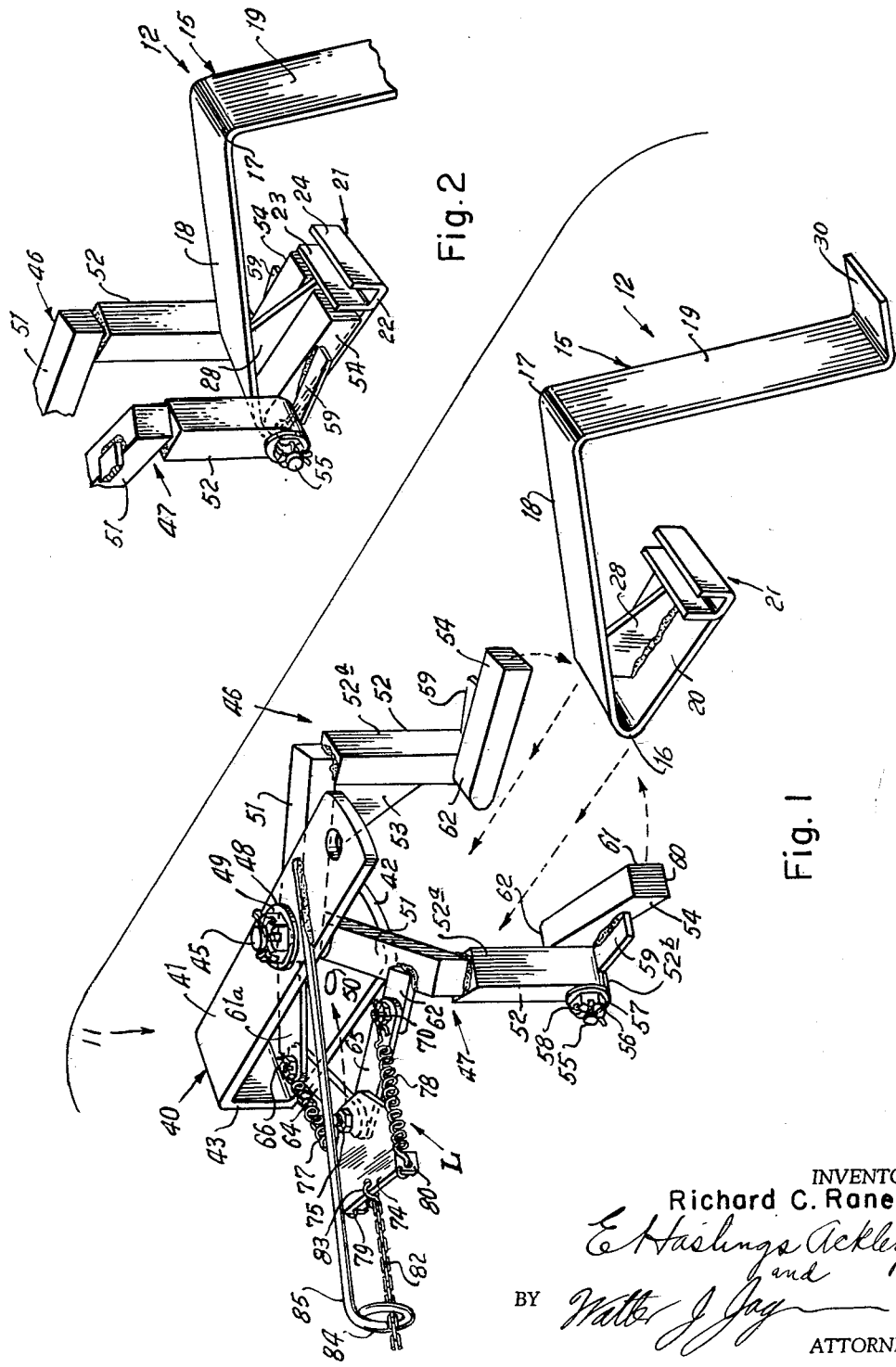
INVENTOR
Richard C. Raney
BY E. Hastings Ackley
and Walter J. Jay
ATTORNEYS April 28, 1964     R. C. RANEY     3,130,982

COUPLING DEVICE FOR VEHICLES

Filed Jan. 4, 1962     2 Sheets-Sheet 2

INVENTOR
Richard C. Raney
BY E. Hastings Ackley
and Walter J. Jagmin
ATTORNEYS

United States Patent Office 3,130,982
Patented Apr. 28, 1964

3,130,982
COUPLING DEVICE FOR VEHICLES
Richard C. Raney, Rte. 1, Cookville, Tex.
Filed Jan. 4, 1962, Ser. No. 164,259
14 Claims. (Cl. 280—477)

This invention relates to couplings, and particularly to coupling devices for vehicles.

One object of this invention is to provide a new and improved coupling device.

Another object is to provide a new and improved coupling device for automatic coupling of vehicles.

Still another object is to provide a new and improved coupling device comprising a coupler member and receiver member which are adapted to be moved into coupling engagement with one another even though there is a substantial misalignment of the coupler and receiver members.

A further object is to provide a new and improved coupling device for vehicles comprising a coupler member having contact arms and means for varying the spacing of the contact arms whereby the coupler member may be coupled to a receiver member by reducing the spacing of the contact arms.

Additonal objects and advantages of the invention will be readily apparent from the reading of the following description of a device constructed in accordance with the invention, and reference to the accompanying drawings thereof, wherein:

FIGURE 1 is a perspective view of the coupling device of this invention showing the coupler member and receiver member thereof in uncoupled condition but in position to be readily moved into coupled engagement with one another;

FIGURE 2 is a fragmentary perspective view of the coupling device of this invention showing the connecting parts of the coupler member and receiver member when in coupled engagement with one another;

Figure 3:
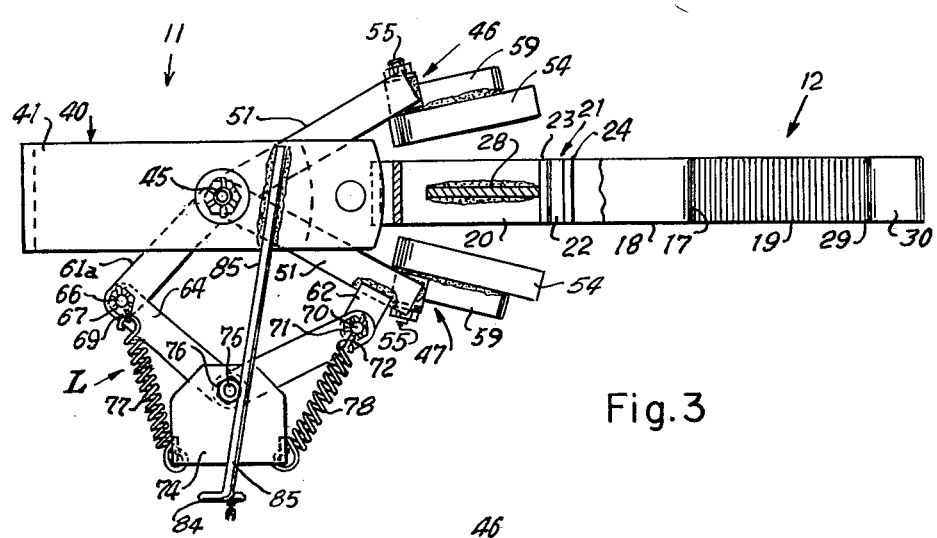
FIGURE 3 is a fragmentary partly sectional view of the coupling device of this invention showing the coupler member and receiver member thereof with contact arms of the coupler member in position to be pivoted into coupling engagement with the receiver member.

Referring now to the drawings, the coupling device 10 of this invention comprises a coupler member 11 and a receiver member 12 which are attachable respectively to a towing vehicle and a vehicle to be towed. The coupler, which is the more complex and expensive part of the coupling, is preferably attached to the towing vehicle and the receiver to the vehicle to be towed since the towing vehicle may be used to move a number of such other towed vehicles one by one from one place to another.

The receiver, which is adapted to be engaged by the coupler, includes an elongate member 15 of uniform width and preferably of metallic material. The member 15 is provided with transverse bends 16 and 17 at longitudinally spaced points to provide an upwardly and rearwardly extending rail section 18, a downwardly and rearwardly extending section 19 extending from the upper end of the section 18 and a section 20 extending angularly from its other outer end. The section 20 forms an acute angle of substantially forty-five degrees with the section 18 and extends from the bend 16 toward the section 19. A channel-shaped member 21 of a length corresponding to the width of the metallic member 15 is attached transversely to the free end of the section 20, by welding or otherwise, with the web or bottom 22 of the channel-shaped member being disposed co-planar with the section 20 and its sides 23 and 24 extending perpendicularly from the bottom 22 in the direction of the rail section 18.

A divider plate 28 is interposed between the channel-shaped member 21 and the bend 16 of the elongate member 15 with a straight edge of the plate welded along the longitudinal center line of the section 20. The divider plate is preferably of such dimensions as to also have one edge engaging the rail section 18 and another edge engaging the side 23 of the channel member 21 and along which edges it may be welded to the rail section 18 and the channel member 21, respectively.

Figure 5:
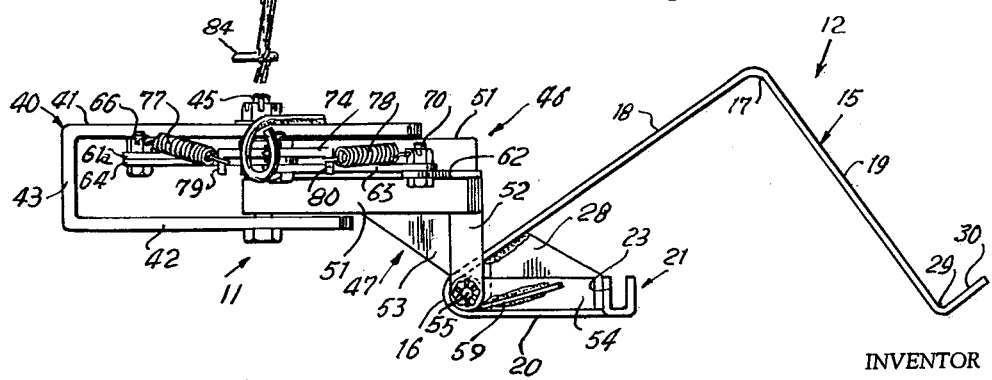

The section 19 has an end section 30 which extends substantially right angularly from the section 19 and on the side thereof opposite the rail section 18. The section 20, the channel member 21 and the end section 30 may be secured to the draw bar of the vehicle to be towed in a suitable manner, as by welding or by bolts. If bolts are used, these members would of course be provided with appropriate apertures through which the bolts would extend. In any event, the receiver is secured to the vehicle by any suitable means, in a manner such that the rail section is inclined from the vertical substantially as illustrated in FIGURE 5, whereby the rail section is in position to be engaged by the coupler 11.

The coupler 11 comprises a substantially U-shaped carrier 40 having parallel upper and lower arms 41 and 42 which are joined at one end by a bight section 43. The carrier is preferably metallic and its arms and bight section may be joined by welding or integrally formed as desired.

The arms 41 and 42 of the carrier are provided with aligned holes, preferably located at their respective longitudinal center lines, for receiving a pivot pin or bolt 45 therethrough upon which are pivotally mounted a pair of contact members 46 and 47. A washer 48 and nut 49 are provided on the threaded end of the bolt for securing the bolt to the carrier.

The coupler may be secured to the towing vehicle in a suitable manner, as by welding or by bolts. In the latter case, the lower arm 42 of the coupler is provided with one or more holes 50, preferably along its longitudinal center line, to permit its attachment by bolts, or the like, to the towing vehicle. The coupler, however, should be attached to the vehicle in such manner that the bolt 45 provides a vertical or substantially vertical pivot axis for the contact members 46 and 47.

Each of the contact members comprises a horizontal arm 51 which is mounted at one end on the pivot bolt 45 for pivotal movement in a horizontal plane when the bolt is disposed vertically. A vertical arm 52 is fixed to the end of the arm 51 remote from the pivot 45, as by welding, and extends substantially perpendicularly and vertically downward therefrom. A triangular bracket or gusset 53, welded along a pair of its intersecting edges to the arms 51 and 52, is provided for bracing the arms.

An elongate contact bar 54 is pivotally mounted on the inner side of each of the arms 52 at the lower end thereof by a pin 55 which is affixed to the contact bar 54 and received within a transverse bore appropriately provided in the lower end portion of the arm 52. The pin 55 which extends through the arm 52 is threaded at its free end portion for receiving a lock nut 56 and washer 57 for securing the contact to the arm. The pin is also provided at its threaded end with a transverse bore for receiving a cotter key 58 which when placed through the bore further secures the contact bar to the arm. Each contact bar 54 is provided with an elongated stop flange 59 along its outer surface for limiting the pivotal movement of the contact bar on the arm 52. The end edge of the stop flange is adapted to engage the curved lower face 52b on the lower end of the arm when the contact bar is pivoted downwardly. Upward pivotal movement of the contact bar is limited by the engagement of the top surface of the stop flange with the front side or face 52a of the vertical arm 52. The stop flange thus limits the pivotal movement of the contact about its pivot 55.

The contact bar 54 of each contact member is shorter in length than the distance between the side 23 of the channel member 21 and the bend 16 of the receiver and is preferably rectangular in transverse cross-section with planar lower and inner faces 60 and 61, respectively, whereby the contact bar is adapted to be located between the receiver sections 18 and 20. In addition, the end of each contact bar nearest the pivot 55 is provided with an arcuate shoulder or surface 62 which extends from the lower face 60 of the contact bar and conforms with the curve of the bend 16 between the receiver sections 18 and 20.

It will thus be apparent that the contact bars 54 are adapted to seat on section 20 of the receiver, as shown in FIGURE 2, when the receiver 12 is properly positioned relative to the coupler 11 and the contact members 46 and 47 of the coupler are pivoted about the pivot 45 to positions whereby the contact bars 54 are disposed between the receiver sections 18 and 20 on opposite sides of the divider plate 28. It will also be apparent that movement of each of the contact bars longitudinally along the section 20 is limited in one direction by the flange or side 23 of channel member 21 and in the other direction by engagement of the arcuate shoulder 62 with the rail section 18. Thus, when the contact members are disposed in the position, illustrated in FIGURE 2, the coupler and receiver are effectively coupled to one another.

The coupler 11 includes a linkage L for pivoting the contact members 46 and 47 simultaneously in opposite directions about the pivot 45. The linkage includes a pair of extensions 61a and 62 rigidly secured to the horizontal arms 51 of the contact members 46 and 47, respectively, as by welding, and a pair of links 64 and 65. One end of the link 64 is pivotally secured to the extension 61a by means of a suitable pivot pin or bolt 66 which extends through suitable aligned apertures in the extension 61a and the link 64. The bolt is provided with the usual nut 67 and a cotter key 69 for preventing rotation of the nut. The link 65 similarly has one end pivotally connected to the extension 62 by a bolt 70 which extends through suitable aligned apertures in the extension 62 and the link 65. The bolt also is provided with the usual nut 71 which is held against rotation by a cotter key 72. The ends of the links 64 and 65 remote from the extensions 61a and 62, respectively, are pivotally connected to one another and to a pivot plate 74 by means of a bolt 75 which extends through suitable aligned apertures in the links and in the pivot plate and is provided with the usual nut 76.

Figure 4:
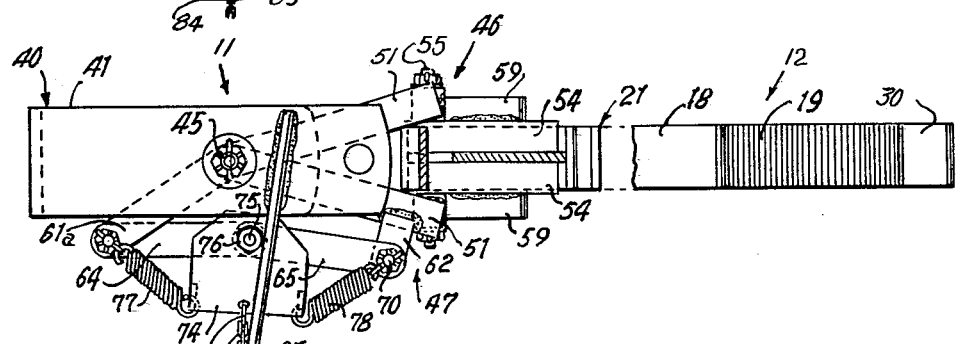
FIGURE 4 is a view similar to FIGURE 3 but showing the coupler member and receiver member when coupled to one another; and, FIGURE 5 is a side view of the coupling device of FIGURE 4.

The contact members 46 and 47 are biased toward the operative receiver engaging position illustrated in FIGURES 2, 4 and 5 by means of the tension springs 77 and 78. The spring 77 has one of its hooked ends extending through the eye portion of the cotter key 69 to secure it to the bolt 66 while its other hooked end portion extends through a suitable aperture in the dependent lug 79 of the pivot plate. The spring 78 similarly has one hooked end portion extending through the eye socket of the cotter key 72 to secure it to the bolt 70 and has its other hooked end portion extending through a suitable aperture in the dependent lug 80 of the pivot plate.

A chain 82 for pulling the pivot plate 74 laterally outwardly of the carrier 40 in order to cause the contact members to move pivotally outwardly relative to one another from the position illustrated in FIGURES 1 and 2, has one end secured to the pivot plate by the usual end link 83 which extends through a suitable aperture in the pivot plate. The pull chain 82 may extend through the eye 84 at one end of the rod 85 whose other end is rigidly secured to the upper arm 41 of the carrier by any suitable means, as by welding.

It will now be apparent that when the pivot plate 74 is pulled laterally outwardly away from the bolts 66 and 70, the springs 77 and 78 are placed under greater tension as the links pivot inwardly toward one another about the bolt 75. Simultaneously, the contact members 46 and 47 pivot outwardly relative to one another about the pivot bolt 45. When the chain is released the force exerted by the springs 77 and 78 is effective to move the contact members 46 and 47 toward one another.

In use, when it is desired that a towing vehicle provided with the coupler member or coupler 11 be employed to move another vehicle having a receiver member or receiver 12 mounted on its draw bar from one location to another, the towing vehicle is backed up toward the draw bar of the vehicle to be towed while the contact members 46 and 47 are held in the pivotally spaced position illustrated in FIGURES 1 and 3 until the contact bars 54 are disposed laterally outwardly of opposite sides of the rail section at any point below any portion of the rail section 18. For example, if the draw bar of the towed vehicle is in a downwardly inclined position and below the level of the coupler 11, the contact bars will necessarily be disposed below the upper portion of the rail section 18 while if the draw bar of the towed vehicle is in exact alignment with the coupler 11, the contact bars 54 will be aligned immediately above the section 20 of the receiver and immediately below the lower portion of the rail section 18 and adjacent the bend 16. The outward pull on the chain is then relaxed to permit the springs 77 and 78 to move the contact members toward one another until the contact bars 54 are disposed below any portion of the rail section 18. As the towed vehicle is then moved forwardly, the arcuate forward surfaces 62 of the contact bars 54 engage the under surface of the rail section 18 and may pivot as required by the particular angle relative thereto at which the rail section 18 is disposed about their pivot bolts 55 so as to adjust thereto. As the towing vehicle continues to move forwardly, the camming action between the contact bars 54 and the under surface of the rail 18 will now cause the draw bar of the towed vehicle to be raised until the contact bars move to the fully seated position illustrated in FIGURES 2, 4 and 5 wherein the arcuate forward surfaces 62 of the contact bars engage the receiver at the forward curve or bend 16 of the member 15 and further continued forward movement of the towing vehicle will now cause the towed vehicle to move with the towing vehicle. Once the coupler has been positioned in towing relationship with the receiver, the coupling device will also be effective to back the towed vehicle since the rear ends of the contact bars 54 will engage the flange or side 23 of the channel member 21. The spacing between the rear end of the contact bars and the side 23 of the channel member is quite small, being only great enough to provide the necessary clearance for the movement of the contact bars into and out of their operative positions within the receiver.

It will be apparent of course that any number of towed vehicles may be provided with the receivers and that only one towing vehicle provided with the coupler 11 may be employed to move the towed vehicles from one location to another as required. For example, the receivers may be mounted on the draw bars of baggage cars employed at airports, railroad stations, and the like, and the coupler 11 mounted on the tractor which moves the baggage cars from one position to another.

It will further be seen that if the free end of the chain 82 is disposed adjacent the seat occupied by the operator of the towing vehicle, the operator does not need to dismount each time that it is necessary to couple or uncouple the towing vehicle from a towed vehicle.

It will also be apparent that the coupling device of the invention may be employed even when the draw bar of the towed vehicle is not disposed in proper horizontal alignment with the coupler 11 of the towing vehicle since the provision of the inclined rail section 18 of the receiver provides a means for raising the draw bar by the towing vehicle as the coupling of the two vehicles is performed.

It will further be seen that exact longitudinal alignment of the reciver and the coupler are also not necessary since the contact members may be spread apart a sufficient distance to enable them to be disposed on opposite sides of the receiver even if the receiver is misaligned longitudinally and subsequent forward movement of the towing vehicle will then cause the receiver and the draw bar to be moved into longitudinal alignment with the coupler so that the contact bars will properly seat in the receiver. It will further be apparent that if the eye of the eye socket 84 of the chain guide 85 is quite large in comparison to the thickness of the chain, the coupling members 46 and 47 and the linkage L may be pivoted as a unit about the pivot bolt 45 by pulling the chain to one side or another in the event this is necessary to compensate for the longitudinal misalignment or lateral displacement of the receiver relative to the coupler. As a result, the coupling device increases the efficiency of operations of the vehicle since the towing vehicle need not be aligned exactly with draw bar of the towed vehicle, either vertically or longitudinally, in order for the coupling device to function properly.

It will further be seen that the coupling device includes a coupler having a carrier securable to a towing vehicle on which are pivotally mounted a pair of contact members having contact bars disposed in the same plane which are adapted to engage the forwardly and downwardly inclined rail section 18 of the receiver member 15, secured to the draw bar of a towed vehicle, whereby relative longitudinal movement of the towed vehicle relative to the towing vehicle after the contact members have been moved pivotally about their common pivot member 45 to positions adjacent one another to move said contact bars into positions for the engagement with the under surface of the rail section 18 will cause the contact bars to move into the socket formed by the lower portion of the rail section 18 and the lower section 20 and on opposite sides of the divider plate 28 so that further continued movement of the towed vehicle will result in the simultaneous movement of the towed vehicle, the divider plate being engaged by the adjacent vertical sides 61 of the contact bars to prevent lateral movement of the contact bars relative to the receiver.

It will further be seen that the contact members 46 and 47 are biased toward one another to operative positions by the springs 77 and 78 and that operator means which include the links 64 and 65, the pivot plate 74 and a pull chain are provided for moving the contact members pivotally away from each other to inoperative position out of engagement with the receiver whereby the operator of the towing vehicle may selectively couple and uncouple the towing vehicle from a towed vehicle.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A coupling device for vehicles including: a receiver mountable on the tow bar of a towed vehicle comprising a rail section inclined downwardly and forwardly, a plate section extending rearwardly and angularly from the lower end of the rail section to form a socket having open sides and a divider in said socket between said plate section and said rail section and between said open sides; and a coupler comprising a carrier mountable on the towing vehicle, a pair of contact members having adjacent end portions pivotally mounted on the carrier for pivotal movement about a common substantially perpendicular axis between operative positions wherein said contact members are adjacent one another and inoperative positions wherein the contact members are angularly spaced from each other, said contact members having contact bars mounted on their other ends disposed in a common plane extending perpendicularly relative to said common axis, said contact bars being engageable with said rail section and receivable in said socket when said contact members are pivoted toward each other to said operative positions, said contact bars being engageable with said divider when said contact bars are disposed in said socket and limit lateral movement of said contact bars in said socket between said rail section and said plate section, camming action between said rail section and said contact bars when said contact members are in said operative positions raising the receiver into desired vertical relationship with the coupler and moving said contact bars into said socket upon forward movement of the carrier relative to said receiver, and means carried by said carrier and operable from the towing vehicle for moving said contact members between said inoperative and operative positions.

2. A coupling device for vehicles including: a receiver mountable on the tow bar of a towed vehicle comprising a rail section inclined downwardly, forwardly and a plate section extending rearwardly and angularly from the lower end of the rail section to form a socket; and a divider between said plate section and said rail section, and a coupler comprising a carrier mountable on the towing vehicle, a pair of contact members having adjacent end portions pivotally mounted on the carrier for pivotal movement about a common substantially perpendicular axis between operative positions wherein said contact members are adjacent one another and inoperative positions wherein the contact members are angularly spaced from each other, said contact members having contact bars mounted on their other ends for pivotal movement about axes extending perpendicularly relative to said common axis, said contact bars being engageable with said rail section and receivable in said socket when said contact members are pivoted toward each other to said operative positions, said contact bars engaging said divider when in said socket and limiting lateral movement of said contact members in said socket, camming action between said rail section and said contact bars when said contact members are in said operative positions raising the receiver into desired vertical relationship with the coupler and moving said contact bars into said socket upon forward movement of the carrier relative to said receiver, means connected to said contact members for biasing said contact members toward said operative positions, and means operable from said towing vehicle for moving said contact members to said inoperative positions.

3. A coupling device for vehicles including: a receiver mountable on the tow bar of a towed vehicle comprising a rail section inclined downwardly and forwardly, a plate section extending rearwardly and angularly from the lower end of the rail section to form a socket, and a divider between said rail section and said plate section; and a coupler comprising a carrier mountable on the towing vehicle, a pair of contact members having adjacent end portions pivotally mounted on the carrier for pivotal movement about a common substantially perpendicular axis between operative positions wherein said contact members are adjacent one another and inoperative positions wherein the contact members are angularly spaced from each other, said contact members having contact bars mounted on their other ends, said contact bars being engageable with said rail section and receivable in said socket when said contact members are pivoted toward each other to said operative positions, said divider limiting lateral movement of said contact bars in said socket, said contact bars being pivotally mounted adjacent their forward ends for pivotal movement about axes perpendicular to said common axis whereby said contact members may pivot into proper engagement with said rail section upon engagement with said rail section, camming action between said rail section and said contact bars when said contact members are in said operative positions raising the receiver into desired vertical relationship with the coupler and moving said contact bars into said socket upon forward movement of the carrier relative to said receiver, and means carried by said carrier and operable from the towing vehicle for moving said contact members between said inoperative and operative positions.

4. A coupling device for vehicles including: a receiver mountable on the tow bar of a towed vehicle comprising a rail section inclined downwardly and forwardly, a plate section extending rearwardly and angularly from the lower end of the rail section to form a socket, and a divider between said rail section and said plate section; and a coupler comprising a carrier mountable on the towing vehicle, a pair of contact members having adjacent end portions pivotally mounted on the carrier for pivotal movement about a common substantially perpendicular axis between operative positions wherein said contact members are adjacent one another and inoperative positions wherein the contact members are angularly spaced from each other, said contact members having contact bars on their other ends, said contact bars being engageable with said rail section and receivable in said socket when said contact members are pivoted toward each other to said operative positions, said contact bars being engageable with said divider to limit lateral movement of said contact bars in said socket, said contact bars being pivotally mounted adjacent their forward ends on said contact members for pivotal movement about axes perpendicular to said common axis whereby said contact members may pivot into proper engagement with said rail section upon engagement with said rail section, camming action between said rail section and said contact bars when said contact members are in said operative positions raising the receiver into desired vertical relationship with the coupler and moving said contact bars into said socket upon forward movement of the carrier relative to said receiver, means connected to said contact members for biasing said contact members toward said operative positions, and means operable from said towing vehicle for moving said contact members to said inoperative positions.

5. A coupling device for vehicles including: a receiver mountable on the tow bar of a towed vehicle comprising a rail section inclined downwardly, forwardly and a plate section extending rearwardly and angularly from the lower end of the rail section to form a socket, and a divider in said socket between said plate section and said rail section; and a coupler comprising a carrier mountable on the towing vehicle, a pair of contact members having adjacent end portions pivotally mounted on the carrier for pivotal movement about a common substantially perpendicular axis between operative positions wherein said contact members are adjacent one another and inoperative positions wherein the contact members are angularly spaced from each other, said contact members having contact bars pivotally mounted on their other ends for pivotal movement about axes extending perpendicularly relative to said common axis, said contact bars being engageable with said rail section and receivable in said socket when said contact members are pivoted toward each other to said operative positions, said divider limiting lateral movement of said contact bars in said socket, said receiver and said contact bars having coengageable surfaces limiting forward and rearward movement of the contact bars relative to said receiver when said contact bars are in said socket; camming action between said rail section and said contact bars when said contact members are in said operative positions raising the receiver into desired vertical relationship with the coupler and moving said contact bars into said socket upon forward movement of the carrier relative to said receiver, and means carried by said carrier and operable from the towing vehicle for moving said contact members between said inoperative and operative positions.

6. A coupling device for vehicles including: a receiver mountable on the tow bar of a towed vehicle comprising a rail section inclined downwardly and forwardly, a plate section extending rearwardly and angularly from the lower end of the rail section to form a socket, and a divider disposed in said socket between said rail section and said plate section; and a coupler comprising a carrier mountable on the towing vehicle, a pair of contact members, said contact members including substantially horizontal arms having adjacent end portions pivotally mounted on the carrier for pivotal movement about a common substantially perpendicular axis between operative positions wherein said contact members are adjacent one another and inoperative positions wherein the contact members are angularly spaced from each other, contact bars, means mounting said contact bars on the other ends of said substantially horizontal arms, said contact bars being engageable with said rail section and receivable in said socket when said contact members are pivoted toward each other to said operative positions, said divider being engageable by adjacent sides of said contact bars for limiting lateral movement of said contact bars in said socket, said contact bars being pivotally mounted by said mounting means adjacent their forward ends for pivotal movement about axes perpendicular to said common axis whereby said contact bars may pivot into proper engagement with said rail section upon engagement with said rail section; camming action between said rail section and said contact bars when said contact members are in said operative positions raising the receiver into desired vertical relationship with the coupler and moving said contact bars into said socket upon forward movement of the carrier relative to said receiver, and means connected to said horizontal arms and operable from the towing vehicle for moving said contact members between said inoperative and operative positions.

7. A coupling device for vehicles including: a receiver mountable on the tow bar of a towed vehicle comprising a rail section inclined downwardly and forwardly, a plate section extending rearwardly and angularly from the lower end of the rail section to form a socket, and a divider disposed in said socket between said rail section and said plate section; and a coupler comprising a carrier mountable on the towing vehicle, a pair of contact members, said contact members including substantially horizontal arms having adjacent end portions pivotally mounted on the carrier for pivotal movement about a common substantially perpendicular axis between operative positions wherein said arms are adjacent one another and inoperative positions wherein the contact members are angularly spaced from each other, contact bars, mounting means connecting said contact bars to the other ends of said arms for pivotal movement about axes extending perpendicularly relative to said common axis, said contact bars being engageable with said rail section and receivable in said socket when said contact members are pivoted toward each other to said operative positions, said divider being engageable by adjacent sides of said contact bars for limiting lateral movement of said contact bars in said socket, camming action between said rail section and said contact bars when said contact members are in said operative positions raising the receiver into desired vertical relationship with the coupler and moving said contact bars into said socket upon forward movement of the carrier relative to said receiver, and a linkage including a pivot plate, a pair of links each having one end pivotally secured to said pivot plate, means pivotally connecting the other end of each of said links to one of said arms, said links being pivotally movable at their ends about axes parallel to said common axis.

8. A coupling device for vehicles including: a receiver mountable on the tow bar of a towed vehicle comprising a rail section inclined downwardly and forwardly, a plate section extending rearwardly and angularly from the lower end of the rail section to form a socket, and a divider disposed in said socket between said rail section and said plate section; and a coupler comprising a carrier mountable on the towing vehicle, a pair of contact members, said contact members including substantially horizontal arms having adjacent end portions pivotally mounted on the carrier for pivotal movement about a common substantially perpendicular axis between operative positions wherein said arms are adjacent one another and inoperative positions wherein the arms are angularly spaced from each other, contact bars, means pivotally connecting the contact bars to other ends of said arms for pivotal movement about axes extending perpendicularly relative to said common axis, said contact bars being engageable with said rail section and receivable in said socket when said contact members are pivoted toward each other to said operative positions, said divider being engageable by adjacent sides of said contact bars when said contact bars are disposed in said socket for limiting lateral movement of said contact bars in said socket, camming action between said rail section and said contact bars when said arms are in said operative positions raising the receiver into desired vertical relationship with the coupler and moving said contact bars into said socket upon forward movement of the carrier relative to said receiver, and a linkage including a pivot plate, a pair of links each having one end pivotally secured to said pivot plate, means pivotally connecting the other end of each of said links to one of said arms, said links being pivotally movable at their ends about axes parallel to said common axis, and at least one biasing means connected to said pivot plate and to one of said arms whereby said biasing means is effective through said linkage to bias said arms toward said operative positions.

9. A coupling device for vehicles including: a receiver mountable on the tow bar of a towed vehicle comprising a rail section inclined downwardly and forwardly, a plate section extending rearwardly and angularly from the lower end of the rail section to form a socket, and a divider disposed in said socket between said rail section and said plate section; and a coupler comprising a carrier mountable on the towing vehicle, a pair of contact members, said contact members including substantially horizontal arms having adjacent end portions pivotally mounted on the carrier for pivotal movement about a common substantially perpendicular axis between operative positions wherein said arms are adjacent one another and inoperative positions wherein the arms are angularly spaced from each other, contact bars, means connecting said contact bars to the other ends of said horizontal arms for pivotal movement about axes extending perpendicularly relative to said common axis, said contact bars being engageable with said rail section and receivable in said socket when said arms are pivoted toward each other to said operative positions, said divider being engageable by adjacent sides of said contact bars when said contact bars are disposed in said socket for limiting movement of said contact bars in said socket, camming action between said rail section and said contact bars when said arms are in said operative positions raising the receiver into desired vertical relationship with the coupler and moving said contact bars into said socket upon forward movement of the carrier relative to said receiver, and a linkage including a pivot plate, a pair of links each having one end pivotally secured to said pivot plate, means pivotally securing the other end of each of said links to one of said arms, said links being pivotally movable at their ends about axes parallel to said common axis, biasing means, means connecting said biasing means to said pivot plate and to one of said arms whereby said biasing means is effective through said linkage to bias said arms toward said operative positions, and means secured to said pivot plate for moving said pivot plate laterally outwardly of said carrier for moving said arms toward inoperative positions.

10. A coupling device for vehicles including: a receiver mountable on the tow bar of a towed vehicle comprising a rail section inclined downwardly, forwardly and a plate section extending rearwardly and angularly from the lower end of the rail section to form a socket, and a divider disposed in said socket between said rail section and said plate section; and a coupler comprising a carrier mountable on the towing vehicle, a pair of contact members, said contact members including substantially horizontal arms having adjacent end portions pivotally mounted on the carrier for pivotal movement about a common substantially perpendicular axis between operative positions wherein said arms are adjacent one another and inoperative positions wherein the arms are angularly spaced from each other, contact bars, means connecting said contact bars to the other ends of said arms for pivotal movement about axes extending perpendicularly relative to said common axis, said contact bars being engageable with said rail section and receivable in said socket when said arms are pivoted toward each other to said operative positions; camming action between said rail section and said contact bars when said arms are in said operative positions raising the receiver into desired vertical relationship with the coupler and moving said contact bars into said socket upon forward movement of the carrier relative to said receiver, and means carried by said carrier and operable from the towing vehicle for moving said contact members between said inoperative and operative positions, said contact bars having means limiting pivotal movement of said contact bars.

11. A coupling device for vehicles including: a receiver mountable on the tow bar of a towed vehicle comprising a rail section inclined downwardly and forwardly and a plate section extending rearwardly and angularly from the lower end of the rail section to form a socket; and a coupler means mountable on a towing vehicle and having a pair of movable means movable toward and away from each other, said movable means being positionable on opposite sides of said rail section when moved away from each other and movable into engagement therewith when moved toward each other, said movable means being receivable in said socket, said movable means when in engagement with the rail section moving the receiver upwardly upon forward movement of the carrier relative to the receiver until said movable means are received in said socket and said receiver is in desired vertical relationship to said coupler.

12. A coupling device for vehicles including: a receiver mountable on the tow bar of a towed vehicle comprising a rail section inclined downwardly and forwardly and a plate section extending rearwardly and angularly from the lower end of the rail section to form a socket; and a coupler means mountable on a towing vehicle and having a pair of movable means movable toward and away from each other, said movable means being receivable in said socket, said movable means when in positions remote from each other being positionable on opposite sides of said rail section and movable toward one another into engagement therewith, said movable means when in engagement with the rail section moving the receiver upwardly upon forward movement of the carrier relative to the receiver until said movable means are received in said socket and said receiver is in desired vertical relationship to said coupler, and means biasing said movable means toward one another and toward engagement with said rail section.

13. A coupling device for vehicles including: a receiver mountable on the tow bar of a towed vehicle comprising a rail section inclined downwardly and forwardly and a plate section extending rearwardly and angularly from the lower end of the rail section to form a socket; and a coupler means mountable on a towing vehicle and having a pair of movable means movable toward and away from each other and receivable in said socket, said movable means being positionable on opposite sides of said rail section when moved away from each other and movable toward one another into engagement therewith, said movable means when in engagement with the rail section moving the receiver upwardly upon forward movement of the carrier relative to the receiver until said movable means are received in said socket and said receiver is in desired vertical relationship to said coupler, means biasing said movable means toward each other and into engagement with said rail section, and operating means operable from the towing vehicle for moving said movable means away from each other and out of engagement with the receiver.

14. A coupling device for vehicles including: a receiver mountable on the tow bar of a towed vehicle comprising a rail section inclined downwardly and forwardly, a plate section extending rearwardly and angularly from the lower end of the rail section to form a socket, and a divider disposed in said socket between said rail section and said plate section; and a coupler means mountable on a towing vehicle having a pair of movable means movable toward and away from one another, said movable means being positionable on opposite sides of said rail section when moved away from one another, and movable into engagement therewith upon movement toward one another, said movable means when in engagement with the rail section moving the receiver upwardly upon forward movement of the carrier relative to the receiver until said movable means are received in said socket and said receiver is in desired vertical relationship to said coupler, said divider being disposed between said movable means when said movable means are in said socket for limiting lateral movement of said movable means in said socket, means biasing said movable means toward engagement with said rail section, and operating means operable from the towing vehicle for moving said movable means out of engagement with the receiver, said receiver and said movable means having opposed surfaces engageable with one another for limiting forward and rearward movement of said movable means relative to said receiver when said movable means are in said socket.

References Cited in the file of this patent
UNITED STATES PATENTS
2,269,023    Hendrick _____ Jan. 6, 1942
FOREIGN PATENTS
543,076    Germany _____ July 19, 1930